Sept. 30, 1947.  H. GUYOD  2,428,155
METHOD AND APPARATUS FOR LOGGING BOREHOLES
Filed April 19, 1943  2 Sheets-Sheet 1
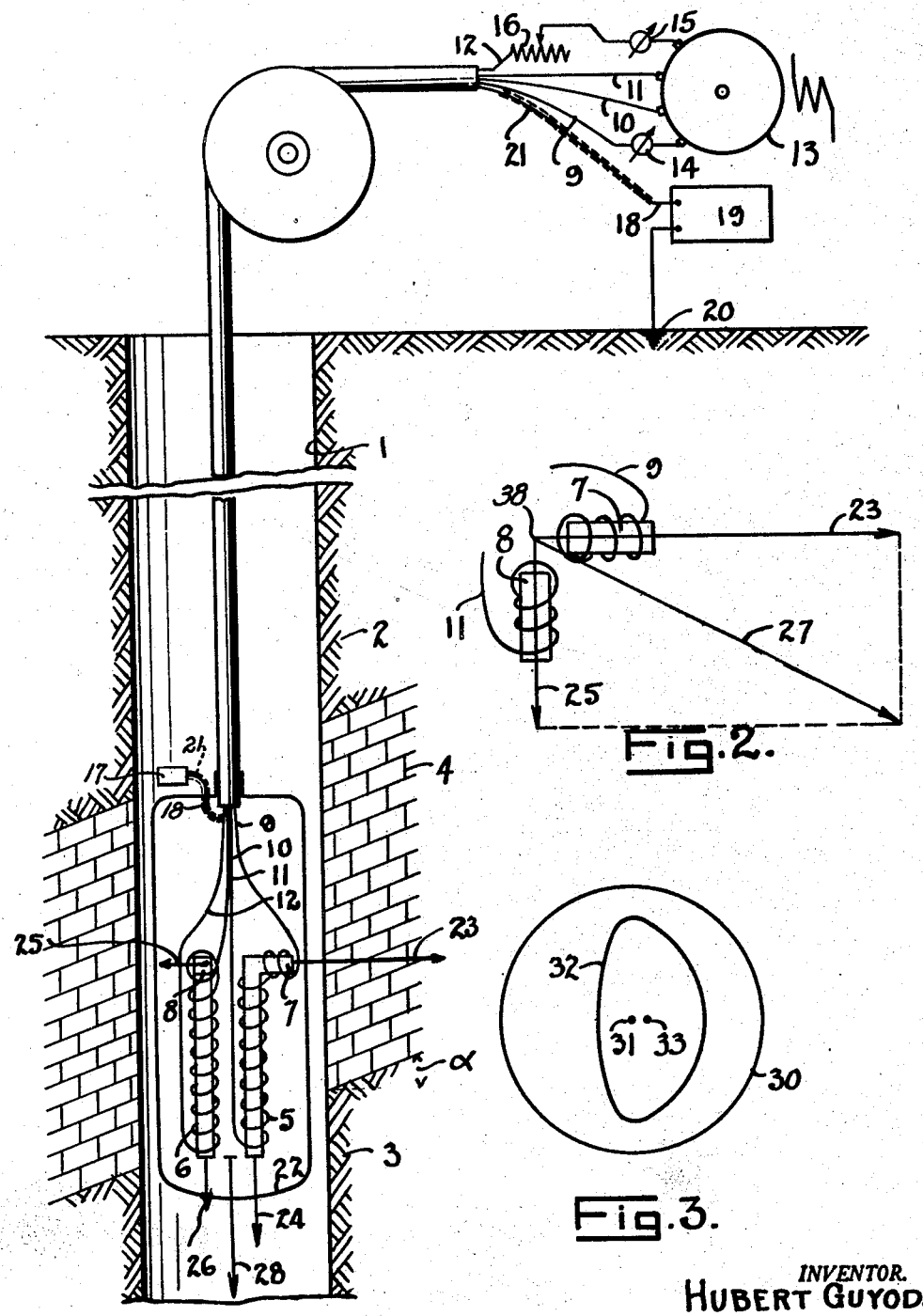
INVENTOR.
HUBERT GUYOD.
BY Lester B. Clark.
ATTORNEY.

Sept. 30, 1947. H. GUYOD 2,428,155
METHOD AND APPARATUS FOR LOGGING BOREHOLES
Filed April 19, 1943 2 Sheets-Sheet 2

INVENTOR.
HUBERT GUYOD.
BY Lester B. Clark.
ATTORNEY.

Patented Sept. 30, 1947

2,428,155

UNITED STATES PATENT OFFICE 2,428,155

METHOD AND APPARATUS FOR LOGGING BOREHOLES

Hubert Guyod, Houston, Tex.

Application April 19, 1943, Serial No. 483,578

3 Claims. (Cl. 175—182)

This invention relates to method and apparatus for logging wells and pertains more particularly to the determination of the degree of anisotropy and other non-homogeneities of the beds penetrated by the well bore.

The invention relates to and broadly comprehends the subject matter of my copending but now abandoned application, Serial No. 329,227, filed April 12, 1940, for Method and apparatus for logging bore holes, and this application is a continuation in part as to my application Serial No. 333,486, filed May 6, 1940, and later abandoned.

It is known that stratified earth formations possess marked differences in electrical characteristics in different directions relative to the bedding planes.

The present invention comprehends both method and apparatus for logging wells but with a particular view of locating isotropic and/or anisotropic formations and determining the various significant features of such formations.

The primary object of the invention is to provide method and apparatus for determining the location, nature and extent of formations penetrated by a well bore.

Another object is to provide information on anisotropic formations penetrated by the well bore.

Still another object is to provide information on non-homogeneities in the beds penetrated by the well bore.

Still another object is to establish an electrical disturbance about the well bore and to measure the variations within the area of the disturbance as an indication of the anisotropic condition.

Another object is to establish electrical conditions in and about a well bore by a variable magnetic field and measuring the variations in the electrical conditions in the area of current conduction as such area is made to traverse the well bore.

The foregoing objects together with others will be apparent from the following description taken in connection with the accompanying drawings in which:

Fig. 1 is a diagrammatic illustration of a well bore penetrating earth formations, an illustrative embodiment of apparatus of the invention being shown;

Fig. 2 is a top view of the coils used in one form of apparatus according to the invention;

Figs. 3 and 4 are graphical illustrations of results obtainable in the practice of the invention;

Fig. 5 illustrates a modified form of energizing unit.

Figures 4, 5:
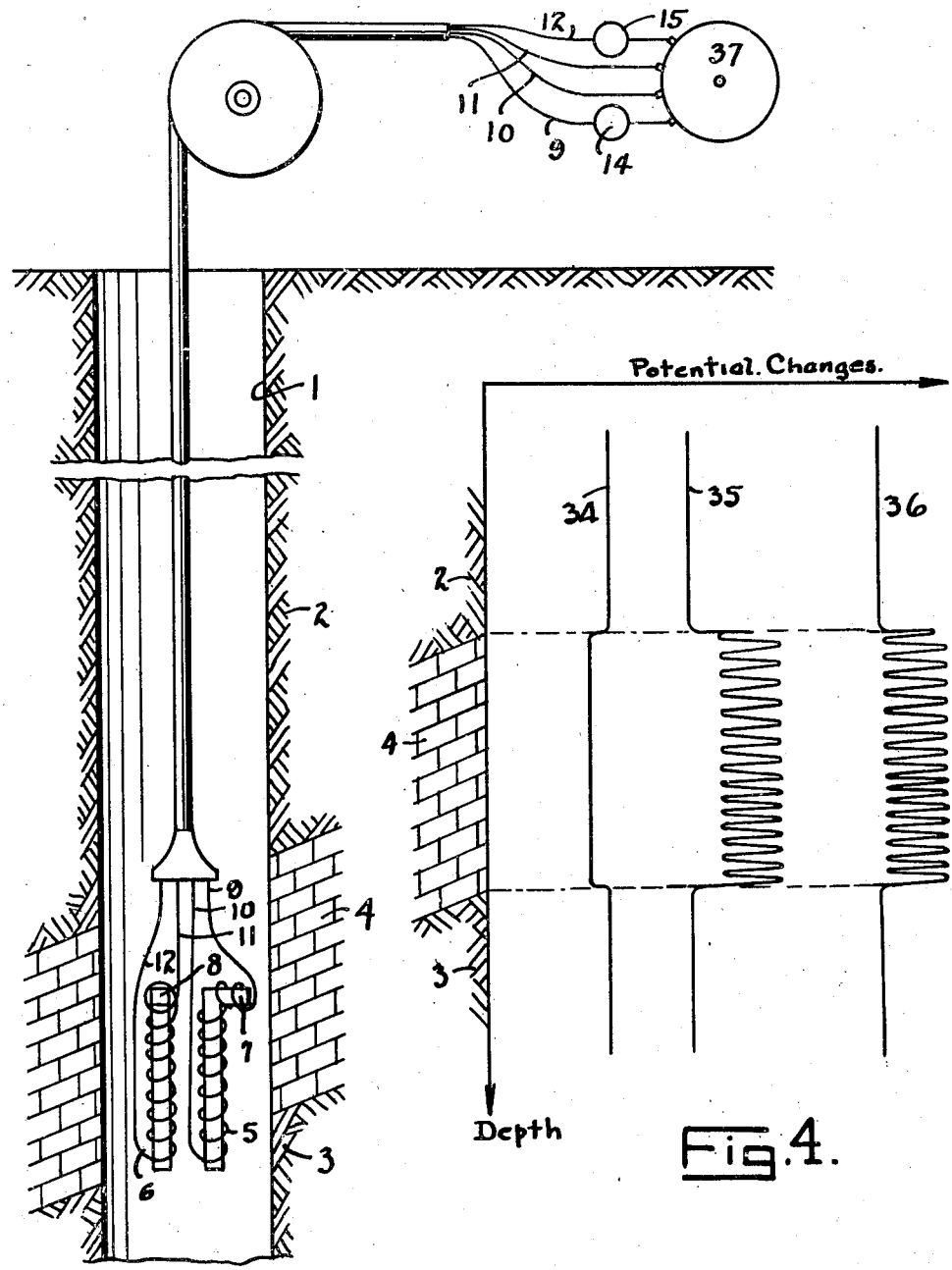

In Fig. 1 there is shown a vertical bore 1 which penetrates isotropic formations 2 and 3 interspersed by an anisotropic bedded formation 4 making an angle $\alpha$ with the horizontal. The illustrative embodiment of apparatus shown in Fig. 1 comprises a source of magnetic flux which is shown schematically as two identical L-shaped iron core coils 5 and 6. The longer arms of these coils are placed close together and are parallel to the axis of the bore hole. The shorter arms 7 and 8 make an angle of 90° with each other in a horizontal plane as shown in Fig. 2 which is a top view of the coils. These coils are connected by means of conductors 9 and 10, and 11 and 12 to a two phase generator 13 located at the surface, near the mouth of the well.

The two alternating currents flowing respectively, in the coils are sinusoidal and one of them is 90° out of phase with the other. Their intensities are read on two meters 14 and 15, and are maintained equal in each circuit by means of a rheostat 16. The frequency will be of at least 100 cycles.

An electrode 17, preferably of the non-polarizing type, is located within the well bore at a short fixed distance—2 feet for instance—above the coils, and is connected by means of conductor 18 to an oscillograph 19 located at the surface and whose other terminal is grounded at 20. The conductor 18 is provided with a grounded magnetic shield 21, so that there will be no current induced into circuit 17, 18, 20 from the power conductors 9, 10, 11, 12.

The potential difference between electrodes 17 and 20 might be relatively small and it is understood that the oscillograph 19 will include such instrumentalities as necessary, so that the desired amplitude of indication will be obtained.

Coils 5 and 6 are mounted in a non-conducting and non-magnetic case, so as to make a single unit 22 which can be lowered inside the bore hole at the end of the conductors which, for the purpose can be assembled as a single cable. Due to the high permeance of the core of the coils, most of the magnetic flux of each coil follows the core with little or no magnetic loss at the bends.

In order to better visualize the behavior of the total magnetic field existing in the vicinity of the electrode 17, the amplitude and direction of this field at a few particular points should be first considered. The magnetic field leaving one of the extremities of a coil, for instance the arm 7 of coil 5, comprises a plurality of lines of flux. For the sake of simplicity it is convenient to suppose that at this pole the effect of all of the lines of flux would be the same as if only one line existed, the intensity of such line being equal to the total flux at this point. Hereafter this line will be termed "mean magnetic flux." By reason of symmetry, this mean magnetic flux is oriented along the axis of the arm 7. Similar consideration can be made regarding the flux near the extremity of the arm 8.

At a given instant, $t$, the magnitude of the mean magnetic flux at the upper and lower extremities of the coil 5 can be represented by horizontal vector 23 (Fig. 2) and vertical vector 24 (Fig. 1). At the same instant the magnitude of the mean magnetic flux at the extremities of the coil 6 can be represented by a horizontal vector 25 (Fig. 2) and a vertical vector 26 (Fig. 1). To the assumptions made previously regarding phase relation and value of currents, the length of the respective vectors is:

Vector $23 = C \sin (2\pi ft + \phi)$

Vector $25 = C \sin \left(2\pi ft + \frac{\pi}{2} + \phi\right)$

Vector $24 = C' \sin (2\pi ft + \phi)$

Vector $26 = C' \sin \left(2\pi ft + \frac{\pi}{2} + \phi\right)$

Where $C$ and $C'$ are constants related in particular to the details of the core form and to the root-mean-square current in the coils, which current is assumed to be several amperes; $\phi$ is the phase angle of the mean flux 23; and $f$ is the frequency of the electric current energizing the coils.

To better visualize the operation of the method, simplification is had in the following disclosure by assuming that the length of the respective arms 7 and 8 is small enough that the origin of the vectors 23 and 25 can be considered as located at the point 38, the intersection of the axes of the two arms. Vectors 23 and 25 are at right angles to each other by virtue of the orientation of the magnetizable members which include the pole pieces 7 and 8. This is illustrated in Fig. 2 of the drawings. The vectors 23 and 25 can be vectorially added and the vector sum thereof is the vector 27 which is of constant length and which is rotating at a constant velocity in the horizontal plane of 7 and 8, it being assumed that the excitation of the coils 5 and 6 is equal.

Also for the sake of simplicity it will be assumed that the vectors 24 and 26, which are parallel and close together, can be replaced by a single vertical vector 28 which may be assumed as being located on the axis of the instrument 22. The length of this vector is:

$$C' \sin (2\pi ft + \phi) + C \sin \left(2\pi ft + \frac{\pi}{2} + \phi\right) = C'\sqrt{2} \sin \left(2\pi ft + \frac{\pi}{4} + \phi\right)$$

It is known that when a magnetic field varies in direction or intensity in a conducting medium, eddy currents and consequently potential changes will be produced in the medium. It is also known that the formations traversed by a bore hole are usually conductive to electric current. It is therefore apparent that when the coils 5 and 6 are energized, the variable magnetic flux represented by the resultant of vectors 27 and 28 will induce electric currents and potential changes which can be picked up by electrode 17. The other electrode 20 will usually be so far from the unit 22 that the variations of potential in its vicinity are negligible, and the potential of this electrode can be used as a reference for the potential measurements.

If the vertical arms of the coils are made long enough—20 feet or more, for instance—the influence of the magnetic flux 28 on electrode 17 will be quite small, and we will assume that it is negligible.

The magnetic flux is not localized at the extremities of the coils and all the space around the unit 22 will be subjected to the magnetic field of the coils. This field will be similar to that of an L-shaped magnet rotating around its long arm, which long arm is parallel to the axis of the bore hole. This field can be roughly divided into two sections; one comprising the mean vertical flux lines occurring immediately below the vertical arms of the coils and one comprising the mean horizontal flux lines, this latter rotating as a whole around the axis of the instrument. To simplify the wording, we shall refer to these groups of flux lines as the vertical and horizontal fields respectively. With the assumption made above regarding the length of the vertical arms of the coils, only or almost only the horizontal field will influence the potential in the vicinity of electrode 17.

It is apparent that the above description of the behavior of the magnetic field has been simplified somewhat and that, quantitatively, the results arrived at are not fully exact. It will be appreciated, however, that there will be a substantially constant horizontal magnetic field rotating at a substantially constant velocity in the vicinity of electrode 17.

The potential of this electrode is controlled by two main factors:

First: the natural potential existing in the ground, that is to say, the potential which could be measured when no artificial current flows in the ground.

Second: the potential changes created by the current induced in the ground by the horizontal field.

Other potentials may also exist, like electrode polarization, stray current potential, etc., but it is assumed that those expert in the art of well logging are aware of them and have knowledge to suppress them or take them into consideration in the interpretation of the result, if necessary.

It is presumed first that the instrument is motionless in the hole so that the natural potential will then be constant. In a homogeneous formation, or in a horizontally bedded formation, the effect of the horizontally rotating field on electrode 17 will be approximately constant, regardless of the angular position of the field. Therefore, the potential difference, V, between the potential electrode 17 and the ground electrode 20 is approximately constant. In polar coordinates, the magnitude of this potential difference can be represented by a circular figure 30—see Fig. 3—which is almost a perfect circle, whose center is 31, pole of the coordinate system. The polar angle at any instant is $(2\pi ft + \theta)$, $\theta$ being the phase angle between the V and the inducing current of the coil 5.

In a tilted anisotropic formation the induced current and, consequently, the related potential V will vary according to the angular position of the horizontal field with respect to the direction of dip of the formation. In the same polar coordnate system, the magnitude of the potential V will be represented by the closed figure 32. This figure is elongated and its center 33 does not necessarily coincide with the pole 31, unless the bedded formation is vertical. The more tilted and/or the more anisotropic the formation is, the greater will be the difference in length between the major and the minor axes of the diagram 32.

Local non-homogeneities can also change the shape or size of the closed figure, for instance, changes in the size of the bore hole, variations of conductivity, etc., so that sometimes the result will be related to several physical changes in or close to the formations to be logged.

When the apparatus is made to travel in the bore hole, the potential of electrode 17 will vary, and the varying potential can be plotted in terms of depths in the form of an electric log.

In the case of the formations assumed on Fig. 1, the electric log would be as illustrated on Fig. 4 where curve 34 shows the potential changes measured without energizing the coils; curve 35 shows the potential changes due solely to the artificial current induced in the ground; and curve 36 represents the total potential changes. Of course, it will usually be impossible to obtain directly curve 35, but by making two sets of measurements, one without and one with the energizing current, curves 34 and 36 will be registered respectively; curve 35 can then be obtained by subtracting curve 34 from curve 36. In many instances this subtracting will not be necessary, because curve 36 will give all the desired information.

It can be readily understood that in many cases the study of curve 35 will allow evaluating approximately the part played by each factor. For instance, an almost straight curve will indicate a good isotropy, whereas wiggles of the same frequency as that of the generator 13 will indicate anisotropy. Changes in the average potential value will be related to changes in the conductivity of the formations, etc.

If the currents used to energize coils 5 and 6 are not sinusoidal, or if their phase angle is different from 90°, the intensity and/or the angular velocity of the horizontal field 27 will vary. If the vertical arms of the coils are short or totally absent, or if the two coils are not identical, or if more coils are used, the horizontal and vertical fields will be different from those heretofore describe. The result obtained under such conditions will no longer be quantitatively, but only qualitatively, similar to those described above.

If the plane of rotation of the horizontal field is not horizontal, the results will also be modified quantitatively. This might be however a necessary feature in certain cases, for instance, if the formations are horizontal or almost horizontal. In fact, in order that the reading be indicative of an anisotropic condition it is necessary that the plane of rotation of the horizontal field be at an angle with the bedding planes.

It seems apparent that the coils can be replaced by one or several rotating permanent magnets, and that similar results will be obtained.

It will be appreciated that the generator 13 can be located inside of the unit 22, and energized either by storage batteries located also in the unit, or from the surface by means of a single conductor. This procedure has the advantage of eliminating a number of conductors between unit 22 and the surface.

Although the use of two coils with independent cores has been mentioned above, it is of course possible to wind the two coils on a single core unit having two horizontal arms and one vertical arm.

The modification in apparatus as illustrated in Fig. 5 relies upon variations in transformer action, and 37 is a constant voltage two phase generator, the phase angle being 90°. It is understood that the current flowing in coils 5 and 6 induces currents in the surrounding formations. These induced currents in turn induce a counter-electromotive force in the coils so that the difference between the applied potential and such counter-electromotive force is instrumental in causing current to flow in the coils 5 and 6. The counter-electromotive force in the respective coils depends upon the nature of the formations angularly with respect to these coils and hence the difference in the readings of the instruments 14 and 15 in conductors 9 and 12 is indicative of the location, extent of anisotropy and/or non-homogeneity of the traversed formations.

While the foregoing disclosure refers to specific examples of procdure and apparatus it is to be understood that the present invention is not confined to such specific techniques and devices. Broadly the invention comprehends method and apparatus for logging wells.

What is claimed is:

1. The method of logging geological formations traversed by a well bore comprising the steps of, subjecting an area about the well bore to a magnetic flux rotating in a predetermined plane and at such a rate that induced currents are created by the rotating flux in conducting formations adjacent to the well bore, and simultaneously measuring within said area the variations in the potential, resulting from the currents induced in the formations, as an indication of the anisotropy of the strata penetrated by the well bore.

2. Apparatus for determining anisotropy of strata penetrated by well bores comprising a plurality of elongated magnetizable members having outwardly extending and angularly spaced pole pieces thereon, magnetizing coils for said members, a source of polyphase current connected to said coils, the ends of said members opposite the pole pieces being displaced from the pole pieces a distance whereby the resultant field proximate the pole pieces is a substantially unipolar rotating field operable to produce an area of current conduction in and about the well bore, and means for measuring the variations in potential at a point within the area of current conductions.

3. Apparatus for determining anisotropy of strata penetrated by a bore hole comprising, a source of magnetic flux to be lowered into the bore hole, said source including magnetized means comprising a plurality of elongated magnetizable members having outwardly extending and angularly spaced pole pieces, means for so energizing said members as to produce a rotating magnetic flux to induce currents in conducting formations adjacent to the well bore, and means for determining the variations in the current pattern in various strata as an indication of the anisotropy of a penetrated formation.

HUBERT GUYOD.

REFERENCES CITED

The following references are of record in the file of this patent:

UNITED STATES PATENTS

| Number | Name | Date |
| --- | --- | --- |
| 1,805,900 | Ambronn | May 19, 1931 |
| 2,139,460 | Potapenko | Dec. 6, 1938 |
| 2,199,367 | Athy | Apr. 30, 1940 |
| 2,211,124 | Jakosky | Aug. 13, 1940 |
| 2,262,419 | Athy | Nov. 11, 1941 |
| 2,271,951 | Pearson et al. | Feb. 3, 1942 |
| 2,278,506 | Zuschlag | Apr. 7, 1942 |